(12) United States Patent
Slavens et al.

(10) Patent No.: US 9,957,808 B2
(45) Date of Patent: May 1, 2018

(54) AIRFOIL LEADING EDGE FILM ARRAY

(71) Applicant: United Technologies Corporation, Hartford, CT (US)

(72) Inventors: Thomas N. Slavens, Vernon, CT (US); Matthew A. Devore, Cromwell, CT (US)

(73) Assignee: United Technologies Corporation, Farmington, CT (US)

( * ) Notice: Subject to any disclaimer, the term of this patent is extended or adjusted under 35 U.S.C. 154(b) by 281 days.

(21) Appl. No.: 14/687,974

(22) Filed: Apr. 16, 2015

(65) Prior Publication Data

US 2015/0322801 A1 Nov. 12, 2015

Related U.S. Application Data

(60) Provisional application No. 61/990,147, filed on May 8, 2014.

(51) Int. Cl.
| | |
|---|---|
| *F01D 5/18* | (2006.01) |
| *F01D 9/02* | (2006.01) |
| *F01D 25/24* | (2006.01) |
| *F01D 25/12* | (2006.01) |

(52) U.S. Cl.
CPC ............... *F01D 5/18* (2013.01); *F01D 5/186* (2013.01); *F01D 5/187* (2013.01); *F01D 9/02* (2013.01); *F01D 25/12* (2013.01); *F01D 25/24* (2013.01); *F05D 2220/32* (2013.01); *F05D 2260/202* (2013.01); *Y02T 50/676* (2013.01)

(58) Field of Classification Search
CPC .......... F01D 5/186; F01D 5/187; F01D 25/12; F01D 5/183
See application file for complete search history.

(56) References Cited

U.S. PATENT DOCUMENTS

| | | | | |
|---|---|---|---|---|
| 4,922,076 A | * | 5/1990 | Cross | ........................ B23H 9/10 219/69.15 |
| 5,332,357 A | * | 7/1994 | Tubbs | ..................... F01D 5/147 415/115 |
| 5,498,133 A | * | 3/1996 | Lee | .......................... F01D 5/186 416/97 R |
| 5,660,525 A | | 8/1997 | Lee et al. | |

(Continued)

FOREIGN PATENT DOCUMENTS

| | | |
|---|---|---|
| DE | 19963375 A1 | 7/2001 |
| EP | 1267041 A2 | 12/2002 |

(Continued)

OTHER PUBLICATIONS

European Search Report for European Application No. 15166932.2 completed Nov. 26, 2015.

*Primary Examiner* — Logan Kraft
*Assistant Examiner* — Sabbir Hasan
(74) *Attorney, Agent, or Firm* — Carlson, Gaskey & Olds, P.C.

(57) ABSTRACT

An airfoil according to an exemplary aspect of the present disclosure includes, among other things, a first cooling hole with a first cooling passage arranged at a first angle relative to a chordwise axis and a second cooling hole with a second cooling passage arranged at a second different angle relative to the chordwise axis. A radial projection of the first cooling passage intersects a radial projection of the second cooling passage.

22 Claims, 5 Drawing Sheets

(56) References Cited

U.S. PATENT DOCUMENTS

| | | | |
|---|---|---|---|
| 5,779,437 | A | 7/1998 | Abdel-Messeh et al. |
| 7,473,073 | B1 | 1/2009 | Liang |
| 7,621,718 | B1 | 11/2009 | Liang |
| 7,878,761 | B1 | 2/2011 | Liang |
| 8,079,810 | B2 * | 12/2011 | Liang .............. F01D 5/186 |
| | | | 416/231 R |

FOREIGN PATENT DOCUMENTS

| EP | 1698757 | A2 | 9/2006 |
|---|---|---|---|
| EP | 1898051 | | 3/2008 |
| EP | 1691033 | | 11/2013 |

* cited by examiner

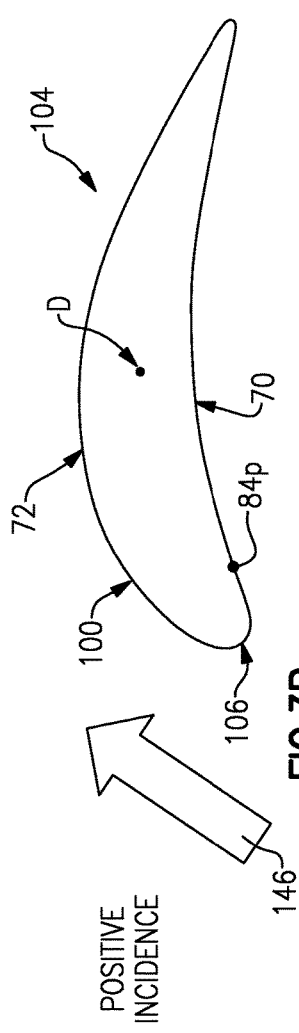
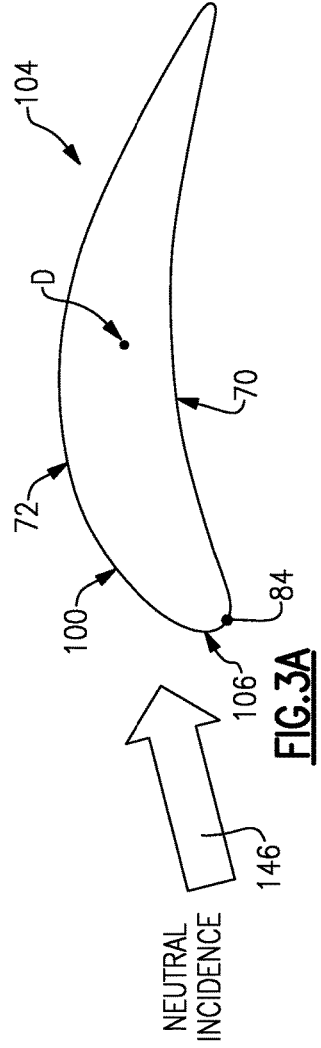
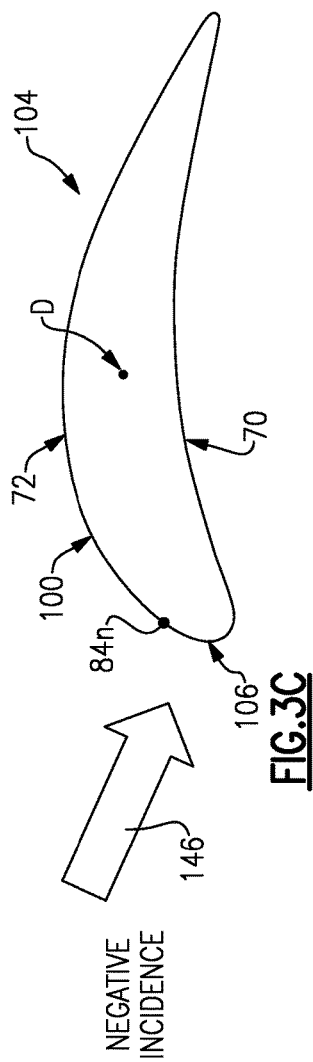

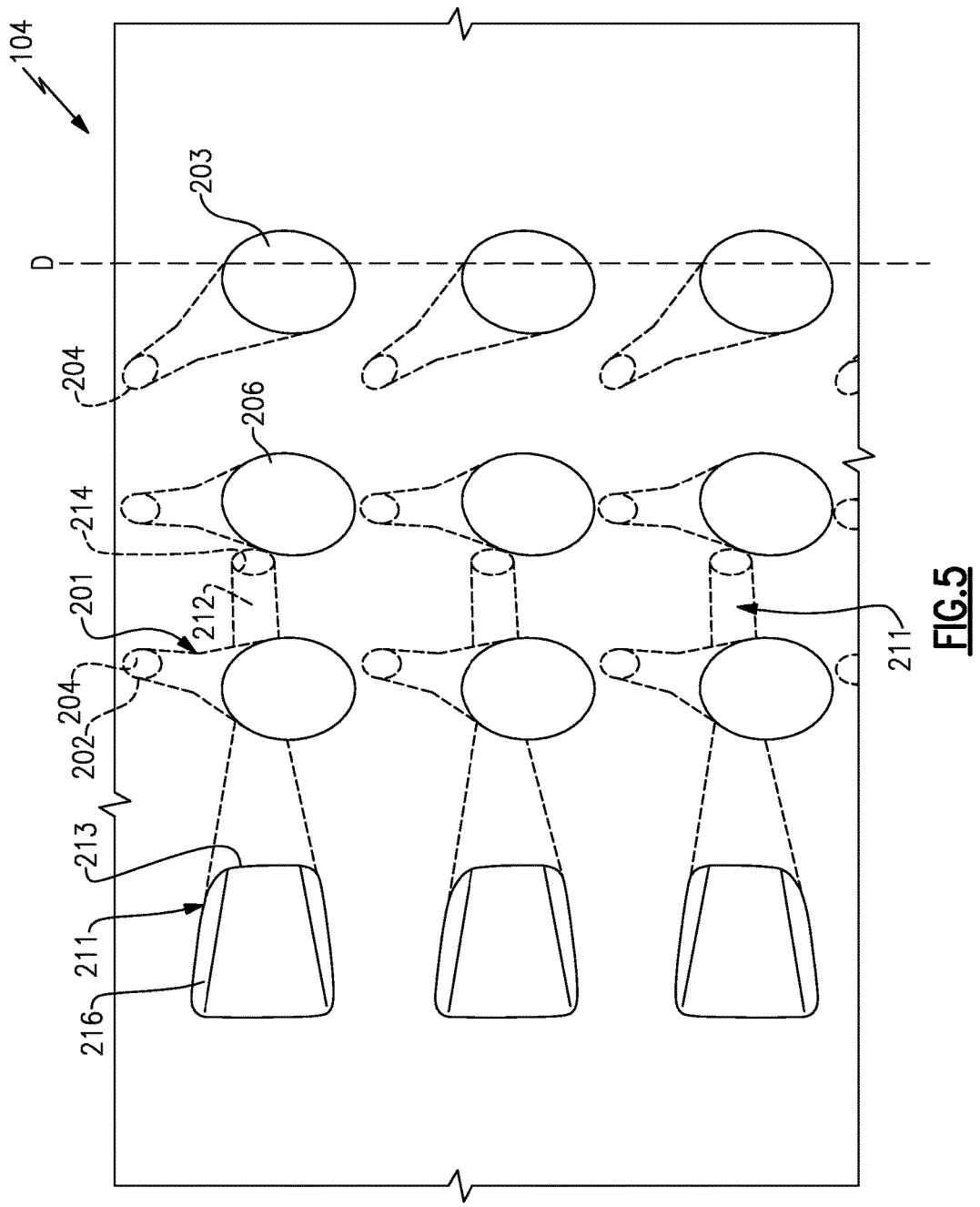

AIRFOIL LEADING EDGE FILM ARRAY

CROSS-REFERENCE TO RELATED APPLICATION

This application claims priority to U.S. Provisional Patent Application No. 61/990,147, filed May 8, 2014.

STATEMENT REGARDING FEDERALLY SPONSORED RESEARCH OR DEVELOPMENT

This invention was made with government support under Contract No. N00014-09-D-0821-0006, awarded by the United States Navy. The Government has certain rights in this invention.

BACKGROUND

This application relates generally to cooling within a gas turbine engine, and more particularly, to airfoil convective film cooling.

Typical gas turbine engines include a fan delivering air into a bypass duct as propulsion air and to be utilized to cool components. The fan also delivers air into a core engine where it is compressed in a compressor. The compressed air is then delivered into a combustion section where it is mixed with fuel and ignited. Products of the combustion pass downstream over turbine rotors, driving them to rotate.

Some portions of the gas turbine engine can include variable vanes. It is known to use many rows of cooling holes distributed on the airfoil surface to provide film cooling at a single predefined stagnation point. As known, adjusting the variable vanes alters flow through the gas turbine engine. Adjusting variable vanes also alters flow to the blades axially downstream of the variable vanes.

Adjusting the variable vanes changes the position and characteristic shape of the stagnation point along the surface of the vane.

SUMMARY

An airfoil according to an exemplary aspect of the present disclosure includes a first cooling hole with a first cooling passage arranged at a first angle relative to a chordwise axis, and a second cooling hole with a second cooling passage arranged at a second, different angle relative to the chordwise axis. A radial projection of the first cooling passage intersects a radial projection of the second cooling passage.

In a further embodiment of any of the foregoing embodiments, at least one of the first and second cooling holes includes a diffuser.

In a further embodiment of any of the foregoing embodiments, the diffuser of the second cooling hole defines a generally quadrilateral cross section In a further embodiment of any of the foregoing embodiments, the diffuser of the first cooling hole defines a generally elliptical cross section.

In a further embodiment of any of the foregoing embodiments, the first cooling hole is on a leading edge of the airfoil.

In a further embodiment of any of the foregoing embodiments, the second cooling hole is on a pressure side of the airfoil.

In a further embodiment of any of the foregoing embodiments, the second cooling hole is on a suction side of the airfoil.

In a further embodiment of any of the foregoing embodiments, the airfoil includes an internal cavity, and both the first cooling hole and second cooling hole are in fluid communication with the internal cavity.

In a further embodiment of any of the foregoing embodiments, the first cooling hole is arranged at a first vertical angle relative to a spanwise axis, and the second cooling hole is arranged a second, different vertical angle relative to the spanwise axis.

In a further embodiment of any of the foregoing embodiments, the difference between the first vertical angle and the second vertical angle is between about 30° and about 120°.

In a further embodiment of any of the foregoing embodiments, the first cooling passage defines a passage axis and a second inlet of the second cooling hole is on an opposite side of the passage axis from a second outlet of the second cooling hole.

In a further embodiment of any of the foregoing embodiments, the first cooling hole has a first inlet and a first outlet and the second inlet is closer to the chordwise axis than the first inlet and the first outlet is closer to the chordwise axis than the second outlet.

In a further embodiment of any of the foregoing embodiments, a ratio of heat load area to a total internal surface area of the first and second cooling holes is between about 0.90 and about 2.20.

In a further embodiment of any of the foregoing embodiments, the airfoil is a variable vane.

In a further embodiment of any of the foregoing embodiments, the airfoil is a stationary turbine vane.

In a further embodiment of any of the foregoing embodiments, the airfoil is a turbine blade.

A section for a gas turbine engine according to an example of the present disclosure includes a rotor and a variable vane positioned downstream of the rotor. At least one of the rotor and variable vane includes an airfoil with a plurality of first cooling holes and a plurality of second cooling holes, each of the first cooling holes having a first cooling passage arranged at a first angle relative to a chordwise axis and each of the second cooling holes having a second cooling passage arranged at a second, different angle relative to the chordwise axis. A radial projection of one of the first cooling passages intersects a radial projection of one of the second cooling passages.

In a further embodiment of any of the foregoing embodiments, each of the plurality first and second cooling holes includes a diffuser.

In a further embodiment of any of the foregoing embodiments, at least one of the first cooling passages defines a passage axis, and a second inlet of at least one of the second cooling holes is on an opposite side of the passage axis from a second outlet of the at least one of the second cooling holes.

In a further embodiment of any of the foregoing embodiments, each of the first cooling holes has a first inlet and a first outlet, and each of the second cooling holes has a second inlet and a second outlet. The second inlet is closer to the chordwise axis than the first inlet and the first outlet is closer to the chordwise axis than the second outlet.

In a further embodiment of any of the foregoing embodiments, the section is a turbine section.

The various features and advantages of this invention will become apparent to those skilled in the art from the following detailed description of an embodiment. The drawings that accompany the detailed description can be briefly described as follows.

BRIEF DESCRIPTION OF THE DRAWINGS

FIG. 3A illustrates a stagnation point of flow across the airfoil of FIG. 2 at section E-E when the flow has a neutral incidence angle.

FIG. 3B illustrates a stagnation point of flow across the airfoil of FIG. 2 at section of E-E when the flow has a positive incidence angle.

FIG. 3C illustrates a stagnation point of flow across the airfoil of FIG. 2 at section of E-E when the flow has a negative incidence angle.

FIG. 5 illustrates a cross section view along line H-H of the airfoil of FIG. 4B.

DETAILED DESCRIPTION

Figure 1:
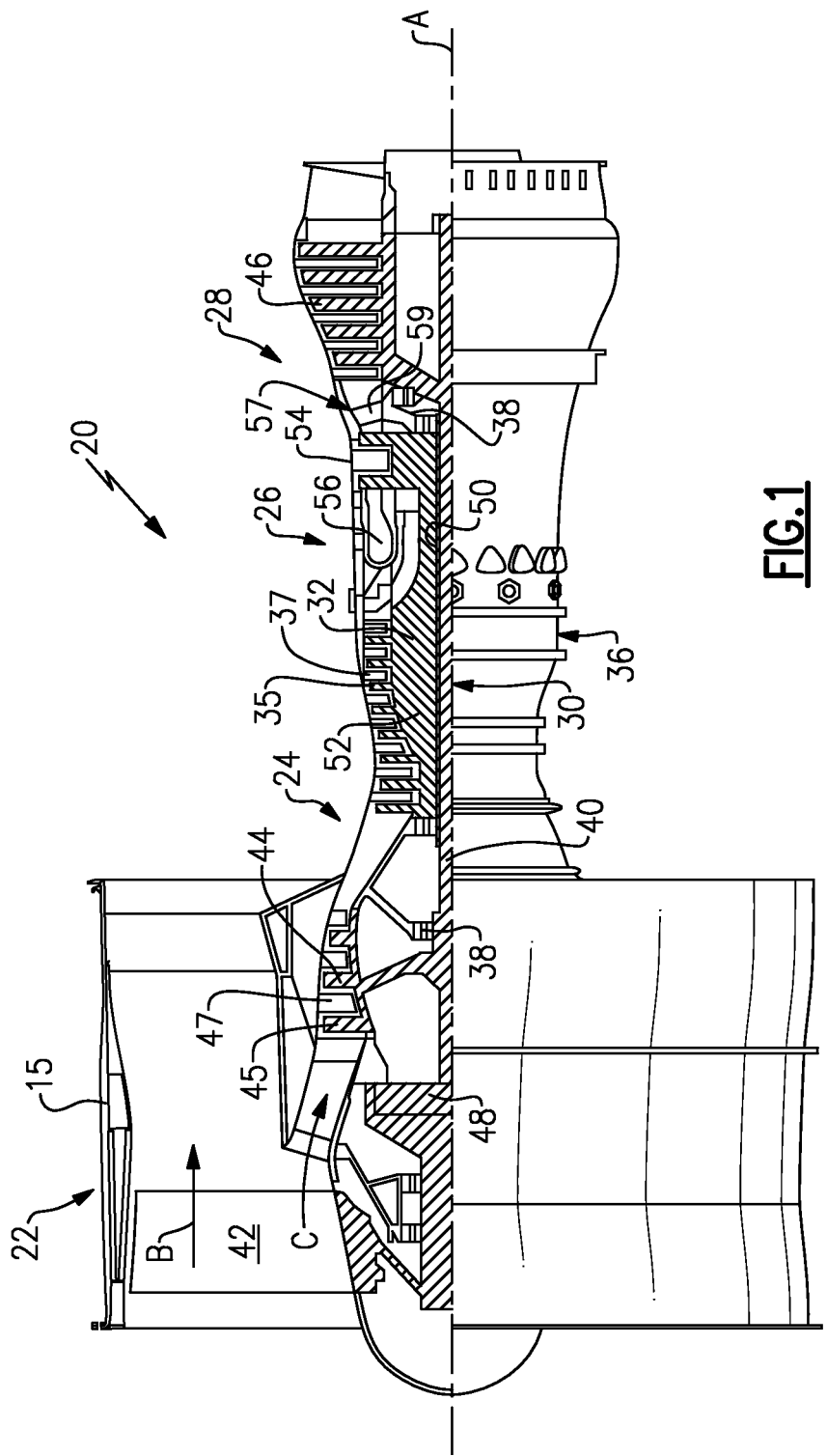
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine engine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second.

Figure 2:
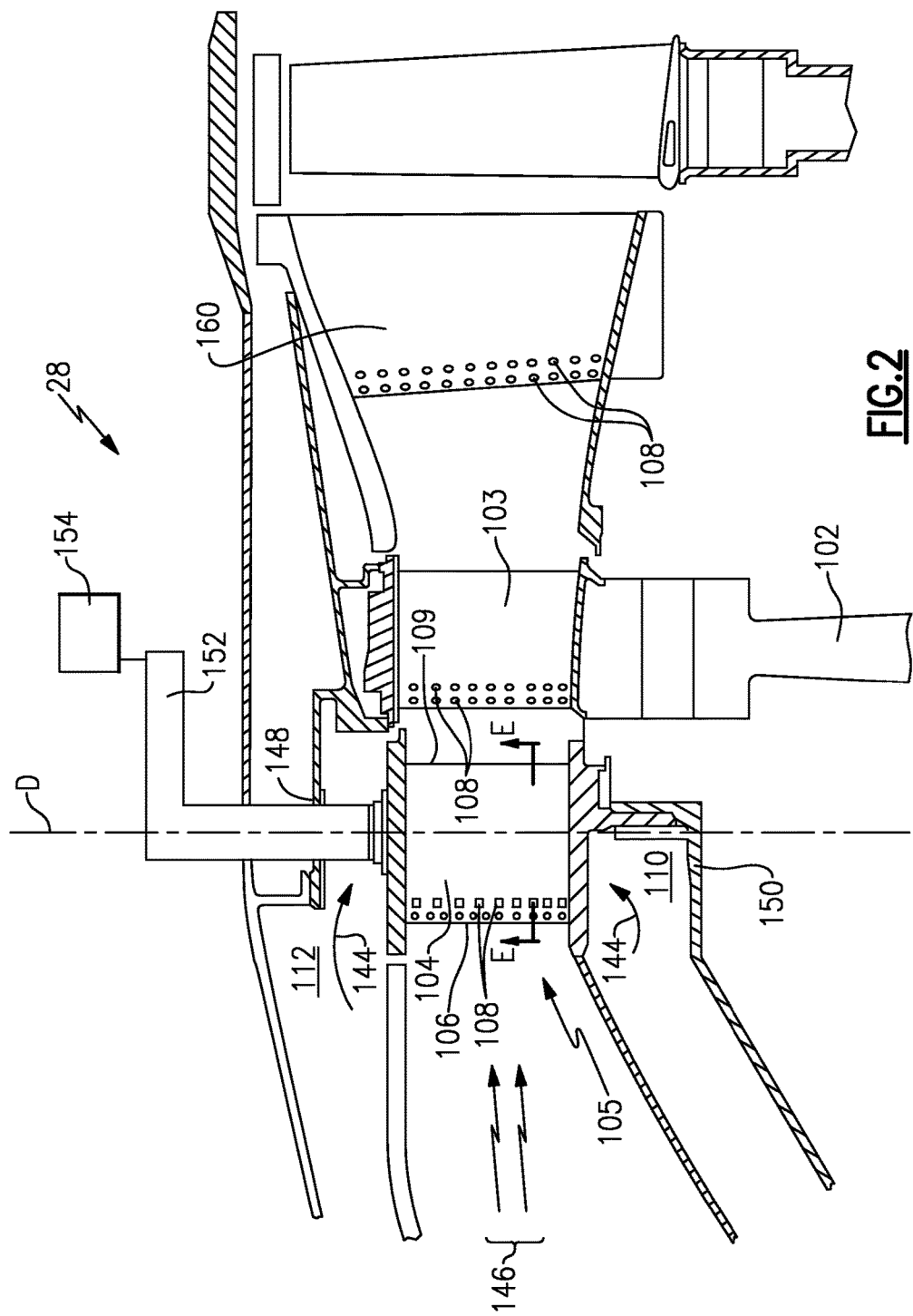
FIG. 2 schematically shows a turbine section including an exemplary airfoil with cooling passages.

FIG. 2 illustrates an example turbine section 28 including a cooled component with a convective cooling passage arrangement which may be used in a gas turbine engine such as engine 20. The example turbine section 28 includes a rotor 102 that supports a plurality of turbine blades 103, stationary turbine vanes 160, and variable vanes 105 each having an airfoil 104. In a disclosed example, a component which is cooled is airfoil 104 of a variable vane 105. It should be understood there are plural circumferentially spaced variable vanes 105. However, the convective cooling passage arrangement disclosed herein can extend to other components having airfoils, including stationary vanes such as stationary vane 160, rotor blades such as turbine blade 103, inlet guide vanes (e.g., the airfoils 59 of the mid-turbine frame 57), and airfoils in the compressor section 24 such as stators 37 and 47 and rotors 35 and 45 (shown in FIG. 1). This disclosure may be particularly beneficial when used in the turbine section 28, as components in this portion of the engine 20 are exposed to relatively high temperatures during engine operation. However, other portions of the engine 20 may benefit from the features herein.

Each airfoil 104 of the variable vanes 105 is rotatable about a spanwise axis D. The airfoil 104 has a leading edge 106 and a trailing edge 109 spaced in a chordwise direction. The variable vane 105 can include a mechanical link 152 attached to an actuator 154. The actuator 154 is configured to change an angle of incidence of the airfoil 104 relative to the incoming high energy gas flow 146. The variable vane 105 is supported within a static structure that includes an outer housing 148 and an inner housing 150.

The variable vane 105 receives cooling air flow 144 from an inner chamber 110 defined by the inner housing 150 and/or an outer chamber 112 defined by the outer housing 148. The air flow 144 is of a relatively cooler temperature than the high energy gases 146 along core flow path C. In one example, the airfoil 104 has a plurality of cooling holes 108 located adjacent to the leading edge 106. Cooling air 144 can be drawn as bleed air from the compressor section 24 and directed through the cooling air chambers 112 and 110 to the airfoil 104, and through the plurality of cooling holes 108 to provide convective and film cooling of the airfoil 104 during operation. The blade 103 and/or stationary turbine vane 160 can also include cooling holes 108.

FIGS. 3A, 3B, and 3C show a highly schematic cross section view of the airfoil 104 of FIG. 2 through line E-E, rotated at various positions relative to the direction of the high energy gas flow 146. A stagnation point 84 is the point on the airfoil 104 where hot working fluid velocity is substantially zero, and is typically the point along the turbine airfoil with the highest thermal loading. Heat load into the airfoil is a function of both the external temperature and fluid-boundary layer conditions. In variable vane assemblies, as the airfoil 104 rotates relative to the direction of the high energy gas flow 146, the stagnation point 84 moves from the leading edge 106 to one of the suction side 72 and the pressure side 70 depending on the rotational position of the airfoil 104. Accordingly, the portion of surface of the airfoil 104 having the greatest relative heat loading changes with rotation of the airfoil 104.

In a neutral incident orientation (FIG. 3A), the leading edge 106, which is at the confluence of the suction side 72 and pressure side 70 of the airfoil 104, is disposed substantially in alignment with the incoming hot gas flow 146. In this position, the stagnation point 84 will be at or substantially near leading edge 106. Rotation of the airfoil 104 about spanwise axis D toward a positive incidence orientation (FIG. 3B) causes the hot gas flow 146 to impact a surface along the pressure side 70. The stagnation point 84p is therefore located at a position on the pressure side 70. Likewise, rotation of the airfoil 104 towards a negative incidence (FIG. 3C) defines the stagnation point 84n at the suction side 72.

In this example, the positive incidence angle of FIG. 3B can be shifted about one-hundred-eighty degrees from the negative incidence angle of FIG. 3C. Thus, the maximum stagnation point 84p of FIG. 3B and the maximum stagnation point 84n of FIG. 3C define a range of stagnation points 84 for flow moving across the airfoil 104.

Because the stagnation point 84 moves along the airfoil 104 surface between the suction side 72 and pressure side 70, the location on surface 100 of the airfoil 104, which may reach a maximum condition, varies. Moreover, movement of the stagnation point 84 by rotation of the airfoil 104 may also create an adverse pressure upon the airfoil 104 that could result in undesirable ingestion of hot gases through the cooling holes 108 due to redistribution of internal cooling flows toward the lowest external pressure locations.

Figure 4A:
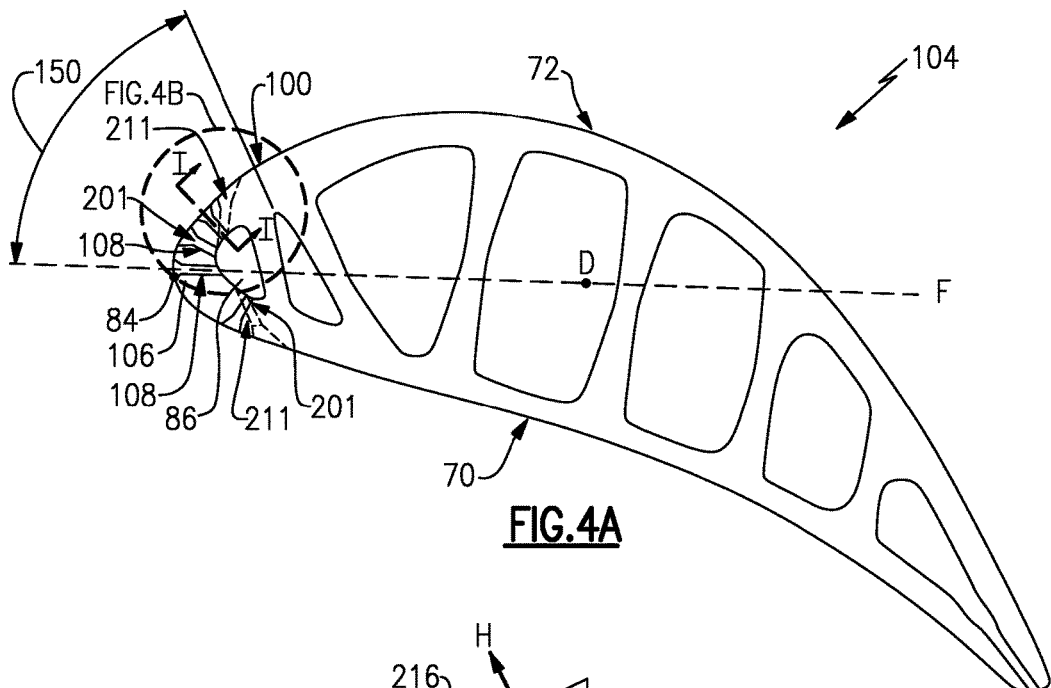
FIG. 4A illustrates a detailed view of section E-E of FIG. 2.

FIGS. 4A-5 show an example airfoil 104 that includes features to improve the cooling efficiency, and compensate for the movement of the stagnation point 84. Referring to FIG. 4A, a heat load area is defined as the area extending a distance 150 from the stagnation point 84 along the surface 100. At stagnation point 84, a surface pressure ratio defined as static pressure over total pressure of about 1.0. A point on the surface 100 at distance 150 has a surface pressure ratio of about 0.95. The airfoil 104 includes features to improve the overall cooling to the heat load area.

Figure 4B:
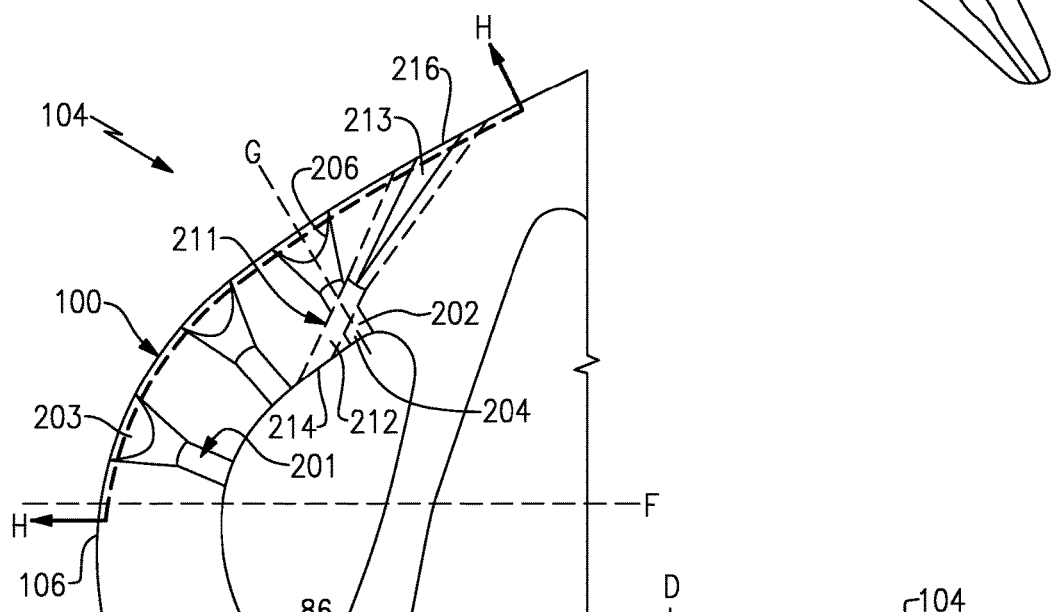
FIG. 4B illustrates the cooling hole configuration of FIG. 4A.

Referring to FIGS. 4A and 4B, the airfoil 104 has a cooling cavity 86 in fluid communication with inner chamber 110 and/or outer chamber 112 (shown in FIG. 2). The cooling cavity 86 communicates cooling air to the cooling holes 108.

The cooling holes 108 include first cooling holes 201 and second cooling holes 211. Each of the cooling holes 201 extends axially through the thickness of airfoil 104. Each cooling hole 201 has an inlet 204 fluidly coupled to cavity 86, an outlet 206 at the surface 100 of the airfoil 104, and a cooling passage 202 to communicate cooling air between the inlet 204 and the outlet 206. In some examples, each cooling hole 201 has a diffuser 203 at the outlet 206.

Each of the second cooling holes 211 has an inlet 214 fluidly coupled to cavity 86, an outlet 216 at surface 100 of airfoil 104, and a cooling passage 212 to communicate cooling air between inlet 214 and outlet 216. The outlet 216 can be located on a suction side 72, a pressure side 70, or both, as illustrated in FIG. 4A. Each cooling hole 211 can also have a diffuser 213 at the outlet 216. In one example, said outlet 216 can be in a different cavity in the airfoil 104 from outlet 206.

A chordwise extending axis F is defined perpendicular to spanwise axis D, and intersects leading edge 106. The first cooling passage 202 is arranged at a first angle relative to chordwise axis F, and the second cooling passage 212 is arranged at a second, different angle relative to axis F. The first cooling passage 202 of first cooling hole 201 defines a passage axis G. The second cooling passage 212 is arranged such that an inlet 214 of the second cooling hole 211 is located on an opposite side of passage axis G from the outlet 216. A radial projection of cooling passage 202 intersects a radial projection of cooling passage 212 within the airfoil thickness. The same would be true of an outlet 216 on pressure side 70. In one example, cooling passage 212 passes beneath at least one cooling passage 202. Of course, along a radial length of airfoil 104 the first and second cooling passages 202 and 212 will alternate.

A pair of the first and second cooling holes 201 and 211 defines a hole cool area being a total internal surface area of the pair of holes 201, 211. Convective cooling can occur as the cooling air 144 passes through cooling holes 201 and 211, and can be dependent on the total internal surface area of the holes 201, 211. In some embodiments, a ratio of the heat load area to the hole cool area is between about 0.90 and about 2.20. In further embodiments, a ratio of the heat load area to the hole cool area is between about 0.90 and about 1.10. However, other ratios of the heat load area to the hole cool area are contemplated.

Figure 4C:
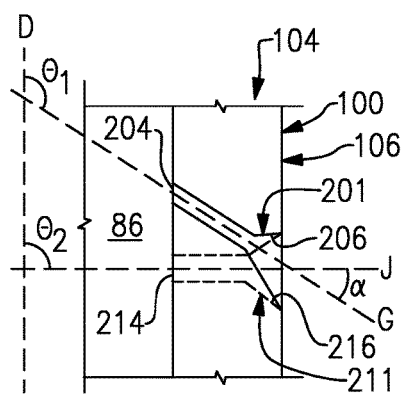
FIG. 4C illustrates a cross section view along line I-I of the airfoil of FIG. 4A.

FIG. 4C illustrates a partial cross section view of the airfoil 104 along line I-I of FIG. 4A. The first cooling hole 201 defines a first passage axis G. The second cooling hole 211 defines a second passage axis J. The first passage axis G is arranged at a first vertical angle $\theta_1$ relative to the spanwise axis D, and the second passage axis J is arranged at a second vertical angle $\theta_2$ relative to the spanwise axis D. First passage axis G and second passage axis J are arranged at angle $\alpha$ relative to one another in a vertical or spanwise direction along axis D.

In some examples, first vertical angle $\theta_1$ and second vertical angle $\theta_2$ are substantially equal to each other, or angle $\alpha$ is about 0°, such that the cooling holes 201 and 211 are arranged approximately parallel to each other in a chordwise direction. Rather, angle $\alpha$ is about 0°, such that the cooling holes 201 and 211 are arranged approximately parallel to each other in a chordwise direction. In other examples, the cooling holes 201 and 211 may have different relative vertical orientations with respect to axis D. For example, angle $\alpha$ or the difference between angle $\theta_1$ and $\theta_2$ is between about 30° and about 120°, and in yet other examples angle $\alpha$ or the difference between angle $\theta_1$ and $\theta_2$ is between about 75° and about 105°. However, other quantities for angle $\alpha$ abd angles $\theta_1$ and $\theta_2$ are contemplated.

FIG. 5 illustrates a partial cross section view of the airfoil 104 along line H-H of FIG. 4B. The first cooling holes 201 can have a diffuser 203 that is substantially elliptical in shape. The second cooling holes 211 can have a diffuser 213 that is substantially quadrilateral in shape, such as a trapezoid. However, the shape of diffusers 203 and 213 can be designed to have other geometries to increase the area of convective cooling of surface 100. Elliptical diffusers 203 are beneficial at the leading edge 106, where there is highly transitional flow over the surface 100. On the pressure side 70 and suction side 72, this configuration may not be as effective because the angle of high energy gas flow 146 with respect to airfoil 104 is not as great on the pressure side 70 and suction side 72 as the leading edge 106. Chordwise extending cooling holes 211 with quadrilateral diffusers 213 can be more effective on the pressure side 70 and suction side 72. Having cooling holes 211 passing beneath cooling holes 201 allows a smaller space between diffusers 203 and 213, improving the amount of convective film cooling provided to the surface 100 of the airfoil 104.

The cooling passages 202 and 212 can be staggered in a radial or spanwise direction such that each of the second cooling passages 212 pass beneath at least one of first cooling passages 202. In further examples, some of the cooling passages 212 pass between two of the cooling passages 202 in the radial or spanwise direction. The cooling passages 202 and 212 can also be arranged at different angles relative to spanwise axis D.

During operation, cooling air 144 enters cavity 86, and inlets 204 and 214. The cooling air in cooling passages 202 and 212 can receive the heat rejected from the body of the airfoil 104 by convection. This cooling air then passes from the cooling passages 202 and 212 out diffusers 203 and 213 to form a convective film of cooling over surface 100. The film formed from the cooling air protects the airfoil from the high temperatures of the high energy gas flow 146.

The arrangement of the cooling passages 202 and 212 provides many benefits by having the projection of cooling passages 202 and 212 intersect in the radial or spanwise direction, the cooling holes 201 and 211 within the airfoil 104 can be more densely packed, to provide additional film cooling and convective cooling. This arrangement results in more surface area within each second cooling passage 212, and therefore increased overall convective cooling provided to the airfoil 104. In some examples, the additional surface area within the cooling holes 201 and 211 can increase convective efficiency by at least 50-220%. Also the arrangement of the cooling passages allows diffusers 203 and 213 to be positioned closer together, which can provide enhanced convective and film cooling for a range of possible stagnation points.

Although an embodiment of this invention has been disclosed, a worker of ordinary skill in this art would recognize that certain modifications would come within the scope of this disclosure. For that reason, the following claims should be studied to determine the true scope and content of this disclosure.

What is claimed is:

1. An airfoil for a gas turbine engine, comprising:
   a first cooling hole, having a first cooling passage arranged at a first angle relative to a chordwise axis;
   a second cooling hole, having a second cooling passage arranged at a second, different angle relative to said chordwise axis, wherein a radial projection of said first cooling passage intersects a radial projection of said second cooling passage, said chordwise axis being defined as an axis perpendicular to a spanwise axis, and extending from a leading edge in a direction towards a trailing edge of said airfoil; and
   wherein said first cooling passage has a first inlet and a first outlet, and said second cooling passage has a second inlet and a second outlet, and said second inlet is closer to said chordwise axis than said first inlet, and said first outlet is closer to said chordwise axis than said second outlet.

2. The airfoil as recited in claim 1, wherein at least one of said first and second cooling passages include a diffuser.

3. The airfoil as recited in claim 2, wherein said diffuser of said second cooling passage defines a quadrilateral cross section.

4. The airfoil as recited in claim 3, wherein said diffuser of said first cooling passage defines a elliptical cross section.

5. The airfoil as recited in claim 4, wherein said first cooling passage is on a leading edge of said airfoil, said second cooling passage is on a pressure side of the airfoil, and wherein said airfoil comprises an internal cavity, and a first inlet of said first cooling passage and said second inlet of said second cooling passage are both in fluid communication with said internal cavity.

6. The airfoil as recited in claim 3, wherein said airfoil is a variable vane.

7. The airfoil as recited in claim 2, wherein said diffuser of said first cooling passage defines a elliptical cross section.

8. The airfoil as recited in claim 1, wherein said first cooling passage is on a leading edge of said airfoil.

9. The airfoil as recited in claim 8, wherein said second cooling passage is on a pressure side of said airfoil.

10. The airfoil as recited in claim 8, wherein said second cooling passage is on a suction side of said airfoil.

11. The airfoil as recited in claim 1, wherein said airfoil comprises an internal cavity, and a first inlet of said first cooling passage and said second inlet of said second cooling passage are both in fluid communication with said internal cavity.

12. The airfoil as recited in claim 1, wherein said first cooling passage is arranged at a first vertical angle relative to said spanwise axis, and said second cooling passage is arranged at a second, different vertical angle relative to said spanwise axis.

13. The airfoil as recited in claim 12, wherein a difference between said first vertical angle and said second vertical angle is between 30° and 120°.

14. The airfoil as recited in claim 1, wherein said first cooling passage defines a passage axis, and a second inlet of said second cooling passage is on an opposite side of said passage axis from a second outlet of said second cooling passage.

15. The airfoil as recited in claim 1, wherein a ratio of a heat load area to a total internal surface area of said first cooling passage and said second cooling passage is between about 0.90 and about 2.20, wherein the heat load area is defined as an area extending from a stagnation point along an external surface of the airfoil to a distance on the external surface having a surface pressure ratio of 0.95.

16. The airfoil as recited in claim 1, wherein said airfoil is a variable vane.

17. The airfoil as recited in claim 1, wherein said airfoil is a stationary turbine vane.

18. The airfoil as recited in claim 1, wherein said airfoil is a turbine blade.

19. A section for a gas turbine engine, comprising:
a rotor;
a variable vane positioned downstream of said rotor;
wherein at least one of said rotor and said variable vane includes an airfoil having a plurality of first cooling passages and a plurality of second cooling passages, each of said first cooling passages having a first cooling passage arranged at a first angle relative to a chordwise axis, each of said second cooling passages having a second cooling passage arranged at a second, different angle relative to said chordwise axis, and a radial projection of one of said first cooling passages intersects a radial projection of one of said second cooling passages, said chordwise axis being defined as an axis perpendicular to a spanwise axis, and extending from a leading edge in a direction towards a trailing edge of said airfoil; and
wherein each of said first cooling passages has a first inlet and a first outlet, and each of said second cooling passages has a second inlet and a second outlet, said second inlet being closer to said chordwise axis than said first inlet and said first outlet being closer to said chordwise axis than said second outlet.

20. The section as recited in claim 19, wherein said plurality of first and second cooling passages each include a diffuser.

21. The section as recited in claim 19, wherein at least one of said first cooling passages defines a passage axis, and a second inlet of at least one of said second cooling passages is on an opposite side of said passage axis from a second outlet of said at least one of said second cooling passages.

22. The section as recited in claim 19, wherein said section is a turbine section.

* * * * *